Patented June 24, 1930

1,767,696

UNITED STATES PATENT OFFICE

EMIL E. NOVOTNY, OF PHILADELPHIA, PENNSYLVANIA, ASSIGNOR TO JOHN STOGDELL STOKES, OF HUNTINGDON VALLEY POST OFFICE, PENNSYLVANIA

SYNTHETIC RESIN AND METHOD OF MAKING THE SAME

No Drawing.  Application filed August 14, 1926. Serial No. 129,282.

This invention relates to the production of synthetic resins or plastics wherein resorcin, a phenolic body, is combined with a dry and substantially anhydrous active methylene body such paraformaldehyde or other dehydration products, polymers and other derivatives of aqueous formaldehyde. The resorcin is mixed with a quantity of say paraformaldehyde whereby an insufficient amount of an aldehyde body or equivalent is combined with the resorcin in order to moderate the reaction and produce fusible and preferably soluble resinous products with unfailing uniformity. It is preferable to use the paraformaldehyde in an amount not to exceed one half of its molecular ratio to the resorcin. Resinous products of great strength, high dielectric qualities and rapid reaction are thus obtained preferably without the use of catalytic and condensing agents.

Where resorcin is combined with paraformaldehyde with or without a catalytic agent great precautions are necessary where the proportion of the aldehyde to the resorcin is approximately equamolecular. It is of course of great advantage to be able to produce a resinous reaction which is preferably fusible and soluble and which may, therefore, be used as a varnish or lacquer for the impregnating and coating of suitable substances. It is likewise advantageous to produce grindable resinous reaction products wherein the resorcin and the active methylene body have been thoroughly and uniformly combined and produce thereby resins of low melting point and good solubility in order that these resinous products may be thoroughly mixed and comminuted with various fillers without materially decreasing the fusibility and solubility of these resins when so mixed.

If the reaction between the resorcin and paraformaldehyde were to be carried out on the basis of equamolecular proportions an exothermic reaction sets in at temperatures lower than 176° F. the reaction proceeds in a portion of the product only, starting usually from the top of the mass and ends in an infusible and insoluble product before the entire mass has been liquefied or for that matter has been formed into a resinous product. As the resorcin is relatively expensive it is necessary that the reaction proceed uniformly throughout the entire mass whereby a large yield of fusible preferably soluble resinous product may be obtained.

The resorcin paraformaldehyde resin has a tensile strength again as high as a resin made of phenol and formaldehyde, it requires no catalytic or condensing agents and there is no appreciable water of condensation formed or liberated. The resin is moreover less thermoplastic and, therefore, is valuable where the finished product must withstand high temperatures. The material shows less carbonization under an arcing test than do the resinous products made with phenol, and it shows less inflammability. These valuable characteristics together with the fact that the product reacts rapidly into a strong hard and set resin makes the material useful for valve packing, etc., under high steam pressures, for a binder in the manufacture of molded commutators, as a coating or reinforcing agent for electrical insulation, etc.

With these desirable attributes, however, it is important that the reaction should be controlled to the point where substantially all of the resorcin is combined uniformly with substantially all of the active methylene body in such a manner and by so regulating the proportions that the reaction will not become too energetic to be controllable. This is readily accomplished where an amount of active methylene body such as for example paraformaldehyde is combined under conditions where the proportion of the paraformaldehyde for example is preferably somewhat less than 54 parts of paraformaldehyde by weight to 100 parts of resorcin or in other words one half mol. of paraformaldehyde to one mol. of resorcin. Even with this reduced amount of aldehyde, however, the reaction is quite energetic and it is preferable, therefore, to use somewhat less paraformaldehyde and it will be found that where the ratio of the paraformaldehyde is on the basis of ¼ mol. paraform to one mol. resorcin a fusible soluble resin has been produced which may be heated for a long time up to a temperature not to exceed 300° F. without becoming infusible and insoluble.

The reaction is preferably carried on without a catalyst and at ordinary atmospheric pressure, and the resin may be made in a pyrex beaker without refluxing as there is no appreciable amount of loss in reagents and apparently there is no separation of water nor has it been possible to detect so far the presence of any synthetic water. Where dry paraformaldehyde is used the reaction can be carried out on a large scale in any suitable open vessel provisions being made for heating and cooling the same within the limits to be given in the examples to follow:

From a physiological standpoint it is preferable to provide a suitable enclosed digester provided with a condenser which may be used for either refluxing or distillation and preferably provided with suitable stirring devices, inlets and outlets for the raw materials, and a jacket for heating and cooling the contents. The reaction between resorcin and paraform is an extremely violent one even though no catalytic agent is present as might be mentioned from the facts gathered from an experimental reaction wherein the parafrom was in the ratio of ½ mol. to 1 mol. of resorcin. Upon heating these products in a pyrex beaker suspended in a water bath, under precautions so that no super heating takes place, the temperature slowly rises to approximately 176° F. where upon there is a rapid rise to about 220° F. while the product is still in the water bath, the water bath having a temperature of 212° F. Under these conditions a vigorous reaction takes place turning the entire mass infusible.

This rapid exothermic reaction explains the great speed with which the final molded infusible product may be produced in suitable dies and therefore, where complicated dies are used it is often advantageous to use a molding plastic more quickly reactive even though the raw material cost be higher.

The larger per diem production together with the elimination of extraneous substances such as the catalyst make the product an extemely valuable one for electrical purposes. By the proper balance of the proportion of preferably paraform to the resorcin it is possible to obtain practically any reaction speed desired, and this at temperatures considerably lower than where phenol is used instead of the resorcin.

It is desirable at times to add to either permanently fusible resin made with less than ¼ mol. of paraform or to the potentially reactive resin made with less than the ½ mol. of paraform an additional amount of paraform or other polymers or other dry active methylene bodies as further combining accelerating or hardening agents. This may be added to the resinous product in various proportions as the requirements of the case would warrant up to an amount which would bring the actual paraform ratio to an equamolecular basis. There is, however, no objection to using the paraform somewhat in excess of this amount. The additional paraform or other active methylene body combines with the previously formed resinous body less energetically at temperatures below 212° F. and as there is no elimination of water in this reaction, highly polished smooth molded parts can be made which leave the mold in a finely polished condition.

The cleaning qualities of the resorcin paraform resin are so marked that the product may be used as a cleaning agent for molds which have become tarnished or stained when other materials had been cast in them. The use of this material will often obviate the necessity for frequent cleaning and polishing of discolored molds.

While it has been found that hydroquinone is not quite as rapid in its reaction as resorcin it is to be considered as a suitable euivalent for the same. While hexamethylenetetramin is not as rapid in its reaction as paraform and while it is objectionable because of the free ammonia liberated it is considered useful for this purpose.

In order that my invention may be better understood the following examples are given by way of illustration, but it is to be understood that wide departures and variations may be made therefrom in both the proportions given and in the temperatures and conditions of reaction.

*Example 1*

Resorcin _____ 55
Paraformaldehyde (38% of molecular weight of resorcin) _____ 12

Proportions given by weight.

Place materials into a suitable vessel such as an ordinary open pyrex beaker and heat beaker and contents over a water bath to a temperature of 230° F. where a reaction occurs of a rather energetic nature. At this temperature a fusible, soluble resin is obtained and heating may be continued until a product of the desired viscosity has been obtained. The longer the product is heated the harder the resin becomes and thus a grindable product can readily be obtained. Although the contents of the beaker are heated over a water bath the temperature rises rapidly to 230° F. and unless the product is cooled the temperature will rise up to 280° F. in a few minutes. This fusible, soluble resin is potentially reactive and will upon heating to say 300° F. or higher go rapidly to its hard set and infusible state. The fusible product produces a very light colored varnish or resin. The intermediate material is soluble in various organic solvents such as alcohol, aceton, furfural, furfuralcohol, etc.

*Example 2*

This example shows the use of a reduced amount of paraformaldehyde of an amount equivalent to ¼ mol. of paraformaldehyde to 1 mol. of resorcin.

| | Parts by weight |
|---|---|
| Resorcin | 55 |
| Paraformaldehyde | 8 |

Heat above in the manner described previously, the temperature rises slowly to 300° F. forming a fusible, soluble resin. If the product is heated for sometime at the temperature of say 300° F. a grindable but fusible, soluble resin results. The product is of the nature of a more or less permanently fusible resin and requires the addition of a suitable hardening agent in order to be converted finally to its hard, set and infusible form. For the hardening agent it is preferable to add an additional amount of paraformaldehyde in an amount equal to at least ½ mol. of paraformaldehyde to 1 mol. of resorcin calculated on the basis of the resin contents of paraformaldehyde and resorcin plus the additional paraformaldehyde added. The paraformaldehyde may be increased until there is an amount added to make the paraformaldehyde on an equamolecular ratio with the resorcin. There is no objection to a slight excess of paraformaldehyde although no real advantage accrues therefrom. The paraformaldehyde reacts rapidly with the resinous product described in this example but the reactivity is so controlled that the material may be mixed or handled without difficulty and the product will keep in this potentially reactive form for an indefinite period of time at ordinary room temperatures.

It is of interest to know that a quantity of resorcin and paraformaldehyde wherein the paraformaldhyde was in the ratio of ½ mol. to 1 mol. of resorcin was placed in a pyrex beaker and heated in an alcohol bath. While the contents were being heated in the alcohol bath the temperature slowly rose in about 20 minutes to 210° F. when the mass slowly reacted to infusibility but there was no violence, perhaps, due to the cooling action of the boiling alcohol.

Two batches of resorcin and paraformaldehyde were placed into suitable trays, one batch was on the basis of ½ mol. paraformaldehyde to 1 mol. resorcin and the other batch was on an equamolecular basis. Both batches were simultaneously heated in an open air electric heated and regulated oven and a temperature of approximately 166° F. was maintained for a period of 12 hours. There was no resin formed and the materials were still apparently in their original state of sub-division. It is, therefore, apparent that resorcin in combination with an active methylene body reacts at temperatures somewhat above 166° F. and that the reaction is an exothermic one which requires great precautions. On the other hand, it is interesting to know that where a resin is preliminarily made utilizing a proportion less than ½ mol. of paraformaldehyde and subsequently further paraformaldehyde is added to such resin the reaction is readily controllable.

Suitable lubricants, modifiers and plasticizing agents of a liquid, semi-solid or solid nature may be added, likewise various coloring materials such as dies and pigments, and these products may be added to the resinous material either before, during or after the reaction. They may likewise be added to the varnish product, the dies preferably in solution and the pigments in colloidal suspension.

What I claim is—

1. The herein described method of making a fusible resinous reaction product of resorcin and paraformaldehyde, which comprises in combining with the resorcin an amount of paraformaldehyde in the proportion of not more than one-half mol. of paraformaldehyde to one mol. of resorcin, and heating the mixture at a temperature of between 212° and 300° F., whereby the reactivity of the mass is modified and a fusible water-insoluble resinous product is produced.

2. The herein described method of producing a potentially reactive water-insoluble fusible resinous reaction product of resorcin and paraformaldehyde, which comprises carrying out a substantially uniform reaction between paraformaldehyde and resorcin by heating a mixture of resorcin and paraformaldehyde in the proportions of one mol. of resorcin with not more than one-half mol. of paraformaldehyde and holding the temperature of the mixture between 212° and 300° F. until a resin of the desired viscosity is secured, and then cooling below 212° F. before the reaction product becomes infusible.

3. A potentially reactive water-insoluble synthetic resin which will not become infusible at ordinary temperatures, comprising a condensation product formed by the reaction, under heat, of resorcin and paraformaldehyde in the proportions of not more than one-half mol. of paraformeldehyde to one mol. of resorcin, and having additional paraformaldehyde added thereto as a hardening agent.

Signed at Philadelphia, in the county of Philadelphia and State of Pennsylvania, this 13th day of August, A. D. 1926.

EMIL E. NOVOTNY.